US011867367B2

(12) United States Patent
Doble

(10) Patent No.: US 11,867,367 B2
(45) Date of Patent: Jan. 9, 2024

(54) SELF-BUILD SOLAR LIGHT KIT

(71) Applicant: SolarBuddy.org Ltd, Newstead (AU)

(72) Inventor: Simon James Doble, Teneriffe (AU)

(73) Assignee: SolarBuddy.org Ltd, Morningside (AU)

( * ) Notice: Subject to any disclaimer, the term of this patent is extended or adjusted under 35 U.S.C. 154(b) by 0 days.

(21) Appl. No.: 17/838,972

(22) Filed: Jun. 13, 2022

(65) Prior Publication Data

US 2023/0400160 A1 Dec. 14, 2023

(51) Int. Cl.

| | |
|---|---|
| ***F21L 4/08*** | (2006.01) |
| ***F21L 4/04*** | (2006.01) |
| ***F21L 4/02*** | (2006.01) |
| ***F21V 33/00*** | (2006.01) |
| ***F21V 23/00*** | (2015.01) |
| ***F21V 23/04*** | (2006.01) |
| *F21Y 115/10* | (2016.01) |
| *F21Y 113/13* | (2016.01) |
| *F21V 17/12* | (2006.01) |
| *F21V 19/00* | (2006.01) |

(52) U.S. Cl.

CPC ................. *F21L 4/08* (2013.01); *F21L 4/027* (2013.01); *F21L 4/04* (2013.01); *F21V 23/002* (2013.01); *F21V 23/004* (2013.01); *F21V 23/0414* (2013.01); *F21V 33/0084* (2013.01); *F21V 17/12* (2013.01); *F21V 19/0055* (2013.01); *F21Y 2113/13* (2016.08); *F21Y 2115/10* (2016.08)

(58) Field of Classification Search

CPC ..... F21L 4/08; F21L 4/027; F21L 4/04; F21V 23/002; F21V 23/004; F21V 23/0414; H02J 7/35

See application file for complete search history.

(56) References Cited

U.S. PATENT DOCUMENTS

| | | | | |
|---|---|---|---|---|
| 7,513,638 | B2 * | 4/2009 | Allsop | F21V 1/06 362/450 |
| 9,080,736 | B1 * | 7/2015 | Salzinger | H05B 45/10 |
| 2007/0297167 | A1 * | 12/2007 | Greenhoe | F21L 4/08 362/183 |

(Continued)

OTHER PUBLICATIONS

SolarBuddy, "Yellow Bucket Features", https://www.youtube.com/watch?v=sWk_IA4JATA Nov. 23, 2020 (Year: 2020).*

(Continued)

*Primary Examiner* — Tracie Y Green
*Assistant Examiner* — Michael Chiang
(74) *Attorney, Agent, or Firm* — MORRISON & FOERSTER LLP

(57) ABSTRACT

Disclosed herein is a solar light kit, comprising: a housing comprising a removably attached solar panel and a removably attached battery; a PCB comprising one or more light sources, the PCB configured to connect to the solar panel and the battery; a lens for diffusing light from the one or more light sources of the PCB, wherein the lens is configured to connect to the housing and the PCB; a plurality of removable fasteners for connecting the lens to one or more of the PCB and housing; and a tool for fastening the plurality of removable fasteners, wherein the housing, the PCB, the lens, the plurality of removable fasteners, and the tool are bundled together unassembled in a kit package.

34 Claims, 12 Drawing Sheets

(56) References Cited

U.S. PATENT DOCUMENTS

| | | | | |
|---|---|---|---|---|
| 2009/0036018 A1* | 2/2009 | Woessner | A63H 17/002 446/95 |
| 2015/0176782 A1* | 6/2015 | McLennan | F21L 4/045 362/183 |
| 2017/0198873 A1* | 7/2017 | Ashmore | F21V 29/70 |
| 2017/0299159 A1* | 10/2017 | Mjelde | E04H 4/148 |
| 2020/0124240 A1* | 4/2020 | Jeong | F21L 4/08 |

OTHER PUBLICATIONS

SolarBuddy, "Brisbane Girl Guides Illuminating Futures", https://www.youtube.com/watch?v=Id_K-zRiydk May 25, 2020 (Year: 2020).*

Home Education Association, Inc., "SolarBuddy", https://www.hea.edu.au/solarbuddy, captured by Wayback Machine Internet Archive on May 14, 2021 (Year: 2021).*

Casey Briggs, "Solar Buddy", https://www.youtube.com/watch?v=InqmbE75UE8, Aug. 1, 2016 (Year: 2016).*

Admin SolarBuddy, "SolarBuddy featuring on Totally Wild-Network Ten", https://www.youtube.com/watch?v=e2si_5M8n1g Nov. 11, 2016 (Year: 2016).*

Admin SolarBuddy, "SolarBuddy and Earth Hour on Toasted TV", https://www.youtube.com/watch?v=NSQC8w3r7k4 , Mar. 23, 2017 (Year: 2017).*

Admin SolarBuddy, "SolarBuddy Children", https://www.youtube.com/watch?v=3Vh6TjPvh2Q , Apr. 28, 2016 (Year: 2016).*

SolarBuddyThailand, https://www.solarbuddythailand.org/ , captured by Wayback Machine Internet Archive on Nov. 11, 2018 (Year: 2018).*

SolarBuddy, "Our JuniorBuddy Program—SolarBuddy", https://www.youtube.com/watch?v=DrZyTjCynaw , publish date Feb. 9, 2020 (Year: 2020).*

* cited by examiner

SELF-BUILD SOLAR LIGHT KIT

FIELD

This disclosure relates generally to solar lights, and more specifically to a solar light kit designed to be constructed by children.

BACKGROUND

Students, especially young children, are more frequently educated using virtual resources, leaving limited room for hands-on activities. More specifically, many young students are not provided opportunities to participate in fundamental, practical engineering projects. Additionally, children in education systems are often unaware of the lack of energy resources for children their age in developing countries. Energy poverty condemns billions of people to darkness, poor health, unfulfilled futures, and repeated cycles of poverty. Energy poverty specifically contributes to more deaths of children each year than AIDS and malaria combined. A solution for reducing energy poverty in developing countries, such as solar lights to provide light in areas of limited resources, exists. However, these lights are generally not accessible to those in need.

Currently, no programs exist which enable students to learn and build a functional device, and donate the device to a child in need. Thus, there is a need for a hands-on educational program which improves STEM-based (science, technology, engineering, and mathematics) education, educates communities about energy poverty in developing countries, and allows students to create a lasting impact on communities in need of energy resources.

SUMMARY

The disclosed solar light kit joins two communities—those living in energy poverty and those in need of improved educational tools—by providing a system in which children have the opportunity to learn, build and donate a solar light device to communities with limited energy resources. The process includes learning about solar lights and energy poverty in developing countries, building a solar light device from a kit with instructions, and donating the solar light to a child in need. The learning experience may additionally include the opportunity to write a letter to accompany the donated solar light to the child receiving the device. Children and families living in energy poverty may intuitively operate the light to complete schoolwork, work, play, and travel in an otherwise dark environment, thereby improving their living standard. The knowledge gained not only from learning how to construct a solar light but also from spreading awareness of energy poverty also contributes to the education of children in developed countries. Additionally, in obtaining the solar light, children in developing countries may learn about solar light systems and how to maintain their personal device, thereby improving children's education in developing countries, too.

In some embodiments, a method of assembling a solar light kit is provided, comprising: providing the solar light kit in a kit package comprising a lens, a printed circuit board (PCB), a housing, a plurality of removable fasteners, and a handheld tool, wherein the housing comprises a removably attached solar panel and a removably attached battery; connecting the PCB to the lens using one or more of the plurality of removable fasteners and the handheld tool, electrically connecting wires from the battery in the housing to a first socket on the PCB and wires from the solar panel in the housing to a second socket on the PCB, wherein the connections are secured by applying pressure between the wires from the battery inserted to the first socket, and between the wires from the solar panel inserted to the second socket; and connecting the housing to the lens using one or more of the plurality of removable fasteners and the handheld tool, wherein each of the solar panel, battery, and PCB fit in one orientation within the housing.

In some embodiments, connecting the PCB to the lens includes orienting a switch on the PCB with one or more illustrated facial features on the lens.

In some embodiments, prior to connecting the wires from the battery and solar panel to the first and second sockets on the PCB, the method includes inserting a seal into a lip of the lens, wherein the lip extends a perimeter of the lens.

In some embodiments, prior to connecting the housing to the lens, the method includes inserting a switch button to a hole in the housing configured to receive at least a portion of the switch button.

In some embodiments, connecting the housing to the lens includes orienting the switch button inserted to the housing with a switch on the PCB connected to the lens.

In some embodiments, subsequent to connecting the housing to the lens, the method includes placing a bumper around at least a portion of the connected lens and housing, wherein the orientation of the bumper around the portion of the connected lens and housing is based at least in part on a position of a button indicator on the bumper, the button indicator configured to align with a position of a switch button inserted to the housing.

In some embodiments, the method includes attaching a removable handle to the housing by connecting at least two pegs on the housing to at least two slots on the handle.

In some embodiments, an angle of an assembled solar light is configured to be adjustable by rotating the handle about the at least two pegs on the housing.

In some embodiments, a height of an assembled solar light is configured to be adjustable by modifying a position of the at least two pegs within the at least two slots of the handle.

In some embodiments, the at least two slots provide at least two height settings for the assembled solar light.

In some embodiments, the first socket is labeled "battery" and the second socket is labeled "solar panel."

In some embodiments, the handheld tool is a screwdriver sized for use by a child and the removable fasteners are screws configured for use with the screwdriver.

In some embodiments, the handheld tool is a wrench sized for use by a child and the removable fasteners include one or more of bolts, nuts, and screws configured for use with the wrench.

In some embodiments, each of the connections between the PCB and the lens, the housing and the lens, the wires from the battery and the first socket, and the wires from the solar panel and the second socket do not require using solder, glue, or adhesive.

In some embodiments, the wires from the battery are removably inserted into the first socket and the wires from the solar panel are removably inserted into the second socket.

In some embodiments, an assembled solar light is repairable by removing the one or more removable fasteners from the connected housing and lens to disconnect the lens from the housing and replacing one or more of the battery, the solar panel, and the PCB.

In some embodiments, a solar light kit is provided, comprising: a housing comprising a removably attached solar panel and a removably attached battery; a PCB comprising one or more light sources, the PCB configured to connect to the solar panel and the battery; a lens for diffusing light from the one or more light sources of the PCB, wherein the lens is configured to connect to the housing and the PCB; a plurality of removable fasteners for connecting the lens to one or more of the PCB and housing; and a tool for fastening the plurality of removable fasteners, wherein the housing, the PCB, the lens, the plurality of removable fasteners, and the tool are bundled together unassembled in a kit package.

In some embodiments, the solar light kit comprises a seal configured to be installed to a perimeter of the lens.

In some embodiments, the housing is configured to receive a switch button, the switch button configured to connect with a switch on the PCB.

In some embodiments, the PCB comprises at least two sockets, a first socket configured to connect to wires from the battery, and a second socket configured to connect to wires from the solar panel.

In some embodiments, the solar light kit comprises a bumper configured to surround at least a portion of the connected housing and lens.

In some embodiments, the bumper comprises a button indicator, a position of the button indicator configured to align with a position of a switch button inserted into the housing.

In some embodiments, the solar light kit comprises a handle configured to removably attach to at least two pegs on the housing, the handle comprising at least two slots configured to receive the at least two pegs.

In some embodiments, an assembled solar light is configured to be hung from or stood with the handle.

In some embodiments, at least one of a height of an assembled solar light and an angle of the assembled solar light about the handle is adjustable.

In some embodiments, the at least two slots provide at least two height settings for the assembled solar light.

In some embodiments, the tool is the only tool needed for assembly of the solar light kit.

In some embodiments, the handheld tool is a screwdriver sized for use by a child and the removable fasteners are screws configured for use with the screwdriver.

In some embodiments, the handheld tool is a wrench sized for use by a child and the removable fasteners include one or more of bolts, nuts, and screws configured for use with the wrench.

In some embodiments, the PCB comprises at least 18 light sources, and the light sources are light-emitting diodes (LEDs).

In some embodiments, a first portion of the light sources are white LEDs, and a second portion of the light sources are colored LEDs.

In some embodiments, at least one light source of the second portion of light sources is a battery indicator for indicating a charge status of the battery.

In some embodiments, the battery is a rechargeable lithium-ion battery.

In some embodiments, the solar panel is a polycrystalline silicon solar panel comprising at least 10 photovoltaic (PV) cells.

In some embodiments, the solar light kit comprises a set of instructions for guiding a user through assembling the solar light from the solar light kit.

BRIEF DESCRIPTION OF FIGURES

The invention will now be described, by way of example only, with reference to the accompanying drawings, in which.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

The disclosed solar light kit comprises a built-in solar panel which charges a battery, the battery powering a plurality of LED lights. One or more components of the solar light kit may be specifically designed to be assembled by children with at most one handheld tool, and without the use of solder, glue, or other adhesives. Additionally, the components of the solar light may be manufactured such that each piece must be assembled in a particular order and orientation. The device may be dimensioned such that it is handheld and portable for a child, and may comprise a removably attachable handle, which allows the device to be stood, hung, or transported with ease. The solar light may comprise additional features, such as a pair of feet and an illustrated face, which humanize the device for the intended end user (i.e., children previously unfamiliar with solar light technology).

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Figure 1A:
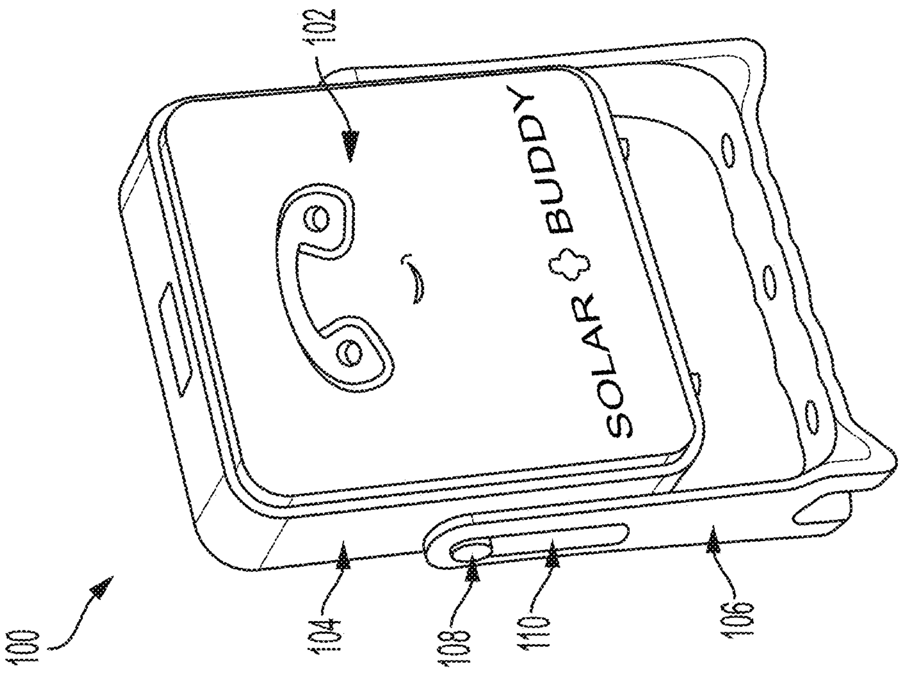
FIGS. 1A-1D illustrate various prospective views of a solar light, in accordance with some embodiments.
Figure 1B:
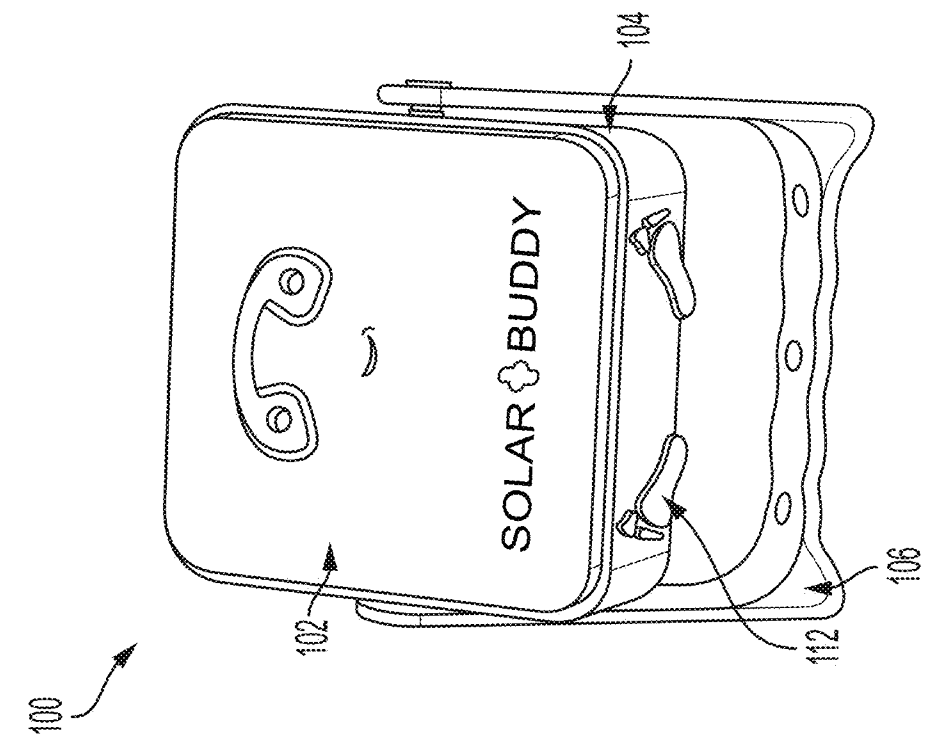
Figure 1D:
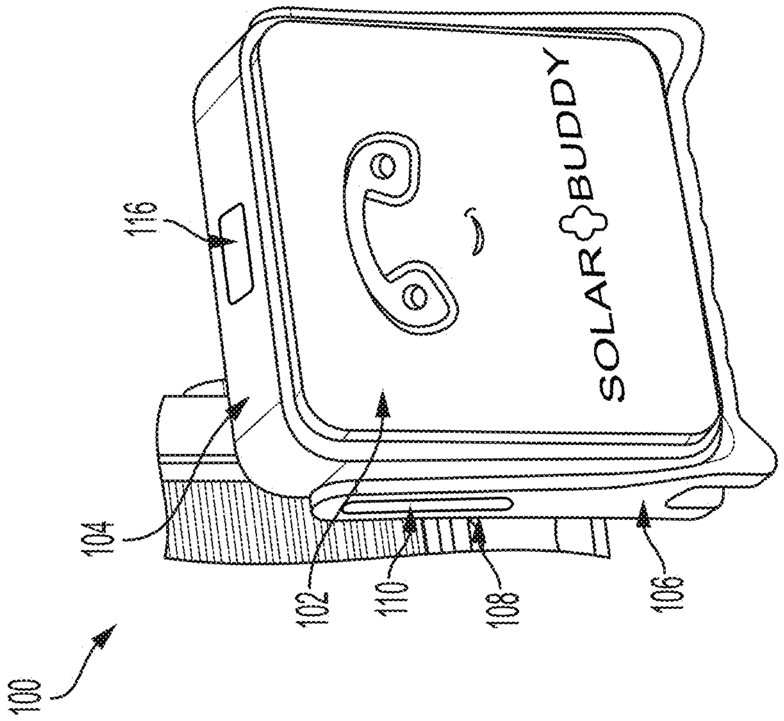

FIGS. 1A-1D illustrate various prospective views of a solar light 100, in accordance with some embodiments. As shown in FIG. 1A, solar light 100 may include lens 102, bumper 104, and handle 106. Bumper 104 may at least partially surround a housing which is removably attachable to lens 102 and protects the electrical components of solar light 100. In some embodiments, lens 102 may comprise one or more design features, such as a logo and an illustrated face, as shown in FIGS. 1A-1B and 1D. The illustrated face may include eyes and a mouth, thereby humanizing the solar light 100 for the builder and intended end user (i.e., children) and making the device more accessible to children who may be unfamiliar with solar technology. The illustrated face may be etched, engraved, or adhered to lens 102, in some embodiments.

Lens 102 may diffuse light from a plurality of light emitting diodes (LEDs) due to the texture on the inner surface of lens 102. The texture on the inner surface of lens 102 may be, for example, a polygonal (e.g., hexagonal) pattern which covers the inner surface of lens 102 except for the facial features. Solar light 100 may comprise a plurality of white LEDs and/or a plurality of colored (e.g., red, green, and blue, or "RGB") LEDs. In some embodiments, solar light 100 comprises up to 18 white LEDs and up to 4 RGB LEDs electrically connected in parallel on a printed circuit board (PCB). In some embodiments, the light comprises only a single RGB LED and a plurality of white LEDs, the RGB serving as a power/charge indicator, as will be described in greater detail below. In some embodiments, the device comprises less than or equal to 14, 16, 18, 20, 22, or 24 total LEDs. In some embodiments, the device comprises greater than or equal to 14, 16, 18, 20, 22, or 24 total LEDs. In some embodiments, the device may comprise any combination of white/colored lights, such as red, green, blue, pink, purple, yellow, orange, etc.

In some embodiments, the intensity of the white and/or colored lights may be altered in accordance with one or more light settings. For example, the lights may be set to three different modes, such as a low, medium, and bright mode. In some embodiments, the lights may be set to two different modes. For example, colored lights may be set to a red light mode (i.e., study mode), and a glowing mode (i.e., party mode). In some embodiments, the light comprises only a single brightness setting. In some embodiments, solar light 100 comprises more than three light settings, such as 4, 5, or 6 light settings. The LEDs employed in solar light 100 may be surface-mount LEDs, such SMD 2835. The LEDs of solar light 100 may be any type of LED suitable to be powered via a solar panel, such as through-hole LEDs, SMD LEDs, bi-color, and/or RGB LEDs. In embodiments with three light settings, the luminosity correlating to each of the three white light settings may be about 4 lm, 34 lm, and 145 lm, respectively.

FIG. 1B illustrates a perspective view of solar light 100, according to some embodiments. Bumper 104 may be manufactured from a synthetic rubber, such as an elastomer, to provide ergonomics to the user, and may surround at least a portion of attached lens 102 and the device housing. For example, bumper 104 may be manufactured from a natural rubber, polyurethane, silicone, or neoprene material. In some embodiments, bumper 104 may be manufactured from a fabric, foam, or other flexible material. In some embodiments, bumper 104 may comprise a texture/pattern to enhance grip and feel for the user. Bumper 104 may be manufactured to withstand wear-and-tear accompanying daily use of the solar light, such as drops, abrasions, water, temperature, and humidity.

Furthermore, bumper 104 may include one or more features 112 on the bottom side of the device resembling feet. Like the facial features on lens 102 described above, foot features 112 may aid in humanizing solar light 100 for the target user of children. Foot features may be a simple oval/circle shape in some embodiments, or may be shaped similar to a human foot, as shown. Foot features 112 may be manufactured from the same material as bumper 104, and may comprise one or more textured patterns, such as that which is found on bumper 104, a logo pattern, or a pattern modeled off of actual foot creases (i.e., further humanizing solar light 100). Solar light 100 may stand using foot features 112 in the instance handle 106 is removed from the device.

As shown between FIGS. 1A and 1B, solar light 100 may be rotatable about one or more pegs 108 on the housing to direct light as desired by a user. Solar light 100 may comprise, for example, two or more pegs 108 on opposing lateral surfaces of the device. In some embodiments, pegs 108 may be located at any position along the lateral surfaces of the light, such as at a middle portion, upper portion, or lower portion. Pegs 108 may be configured to be received via one or more slots 110 on handle 106, illustrated in FIG. 1A. Slots 110 may have a vertical length along a portion of handle 106, such that pegs 108 may translate along the length of slots 110 to raise and/or lower solar light 100. Slots 110 may provide, for example, three lockable height positions for the device. In some embodiments, less than three height positions may be provided on the device, such as 1 or 2 height positions. In some embodiments, 4, 5, or more height positions may be provided by slots 110. As shown in FIG. 1D, light 100 may be adjusted to the lowest position on slot 110 and aligned such that the face of lens 102 is flush with handle 106. With this alignment, solar light 100 may be easily portable and is compact for the user.

Figure 1C:
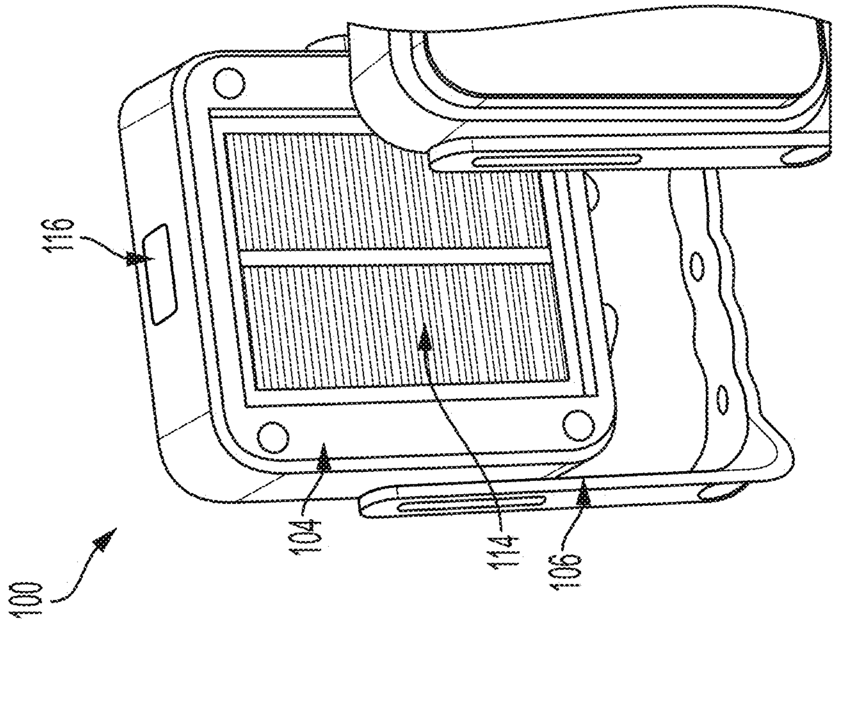

FIG. 1C illustrates a back view of solar light 100. As shown, the face of solar light 100 opposite lens 102 comprises solar panel 114. Solar panel 114 may be removably attachable to a housing of solar light 100. Solar panel 114 may generate energy to charge a battery, the rechargeable battery providing power to the plurality of LEDs within the solar light 100. Solar panel 114 may be polycrystalline silicon, and may comprise 12 photovoltaic (PV) cells electrically connected in series. In some embodiments, solar panel 114 may comprise less than 12 PV cells, such as 6, 8, or 10 cells. In some embodiments, solar panel 114 may comprise greater than 12 PV cells, such as 14, 16, or 18 cells. In some embodiments, solar light 100 may comprise one or more other types of solar panels, such as monocrystalline and thin-film panels.

In some embodiments, solar light 100 may comprise a rechargeable battery (illustrated in FIG. 3A), such as one or more lithium-ion batteries. The battery may be removably attachable to the housing of solar light 100. Battery 100 may be, for example, lithium, alkaline, or nickel metal hydride (NiNM) batteries. In some embodiments, solar light 100 may include a 1000 mAh 3.6V lithium polymer battery. The lithium-ion battery may be suitable for use in solar light 100 due to characteristics including a single-cell construction, which may provide a less complex assembly for the user. Additionally, the battery may be lightweight and have a high energy density. The integration of a lithium-ion battery in solar light 100 may provide a low self-discharge rate of about 3% a month and low maintenance, since lithium does not require the battery to be cycled at regular intervals to preserve its maximum capacity. In some embodiments, the integrated battery in the solar light may be a nickel-metal hydride (NiMH) battery, such as a 750 mAh 3.6 V NiMH battery. The NiMH battery may comprise 3 cylindrical cells in series. In some embodiments, each of solar panel 114 and the battery may be wired using silicone rubber and a 26 AWG gauge.

The rechargeable battery may provide up to 140 hours of light, dependent on the battery type, battery size, solar panel characteristics, and estimated light output. For example, solar light 100 may provide a total of about 140 hours of white light on low-mode, about 14.5 hours of white light on medium-mode, and about 3.5 hours of white light on high-mode before requiring a solar charge. In some embodiments, solar light 100 may provide up to 26.3 hours of RGB light in party mode, and up to 10.5 hours of RGB light in study-mode. For a fully discharged battery, solar light 100 may require between about 9 to 17 hours for a full solar charge, depending on the light's exposure to the sun. For example, solar light 100 may require 9-12 hours, 12-15 hours, or up to 17 hours for a full solar charge. In some embodiments, the battery life after storage of the device may decrease over time. For example, after 1 day, the battery life of the device may be reduced by about 5%. Likewise, the battery life after 30 days may be reduced by about 6%, after 60 days by about 8%, and after 150 days by about 12%.

Solar light 100 may include a battery charging indicator and/or a battery level indicator (not illustrated), which may be implemented via one or more colored LEDs, for example. Additionally, solar light 100 may comprise circuitry which allows for overcharge and/or over-discharge protection, as well as an auto shutdown feature when the device is at low battery. Solar light 100 may be waterproof (e.g., has an IP54 waterproof rating) and be designed with one or more features which provide sun exposure protection.

In some embodiments, solar light 100 may additionally comprise a button indicator 116 on bumper 104. Button indicator 116 may be located, for example, along a lateral side or at the top of solar light 100. The button indicator 116 may correspond with a button and switch mechanism on the inside of the light, as will be described in greater detail below. By engaging with button indicator 116, the user may turn the light on and off, as well as toggle between light settings, as described above. Button indicator 116 may include one or more design features, such as an outline with a logo.

Solar light 100 may be sized such that it is handheld, lightweight, and portable for the intended user (i.e., children). For example, the device may weigh between 325 g and 375 g (e.g., 350 g), and may be about 100 mm wide and 98 mm tall, without a stand/handle 106. In some embodiments, solar light 100 may be larger or smaller than 100 mm wide by 98 mm tall. For example, the width and/or height of solar light 100 may be less than or equal to 80 mm, 85 mm, 90 mm, 95 mm, 100 mm, 105 mm, 110 mm, 115 mm, or 120 mm. In some embodiments, the width and/or height of solar light 100 may be greater than or equal to 80 mm, 85 mm, 90 mm, 95 mm, 100 mm, 105 mm, 110 mm, 115 mm, or 120 mm. With handle 106, the device may be greater than 100 mm tall, for example, about 106 mm tall. However, the height of the device may vary based on the height setting of handle 106. The thickness of the solar light may be about 30 mm, thus allowing a child to easily hold and grip the solar light. In some embodiments, the thickness of the device may be less than or equal to 20 mm, 25 mm, 30 mm, 35 mm, or 40 mm. In some embodiments, the thickness of the device may be greater than or equal to 20 mm, 25 mm, 30 mm, 35 mm, or 40 mm.

Unless stated otherwise, one or more components of the solar light kit 100 may be manufactured from plastic, such as polyethylene and/or polypropylene. For example, the housing, lens 102, and/or handle 106 may be manufactured from plastic such as those described above or another type of plastic. In some embodiments, solar light 100 may be manufactured in a plurality of colors. The different color options for the device may correlate to the intended use of the device. For example, a solar light intended for use in education settings may be yellow or black. In some embodiments, a solar light intended for use in corporate settings may be light or dark blue. Lastly, a solar light intended for use in festival/party settings may be light or dark purple. However, any color may be selected for any intended use of the device. Providing a color option may increase user satisfaction and allow the user to customize their solar light.

Figure 2A:
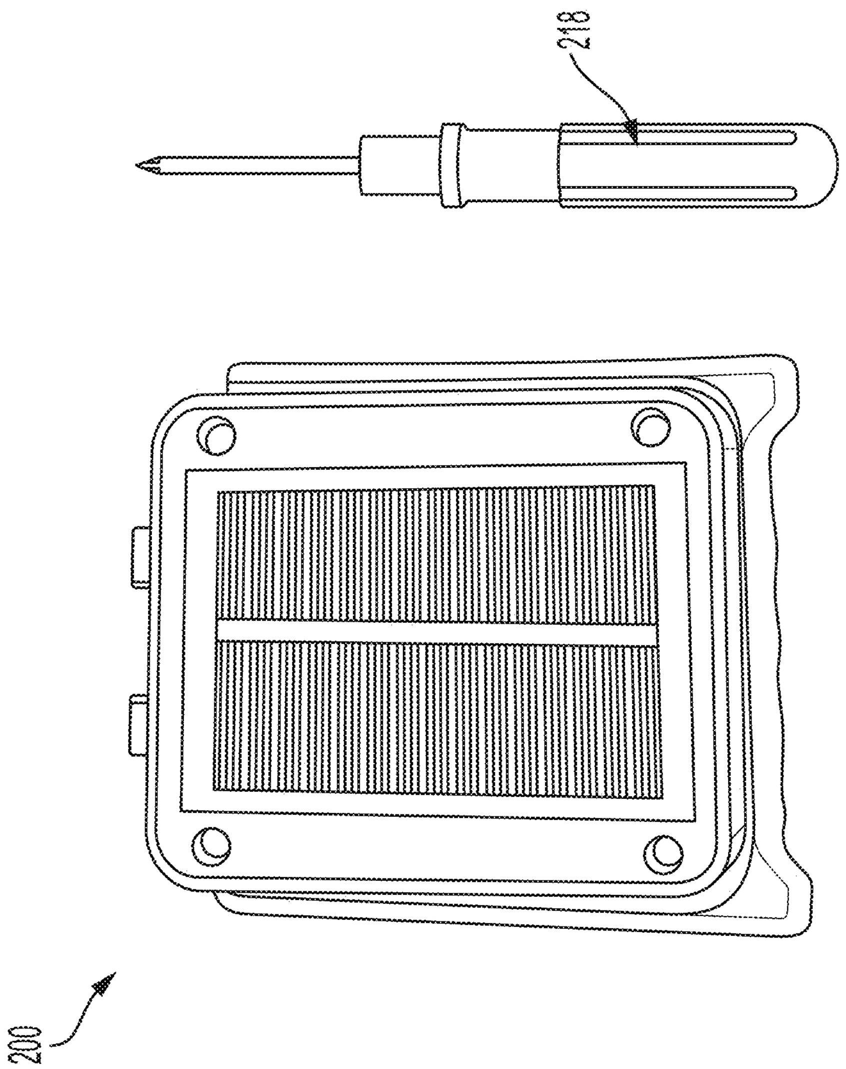
FIGS. 2A-2B illustrate components of a solar light kit package, in accordance with some embodiments.
Figure 2B:
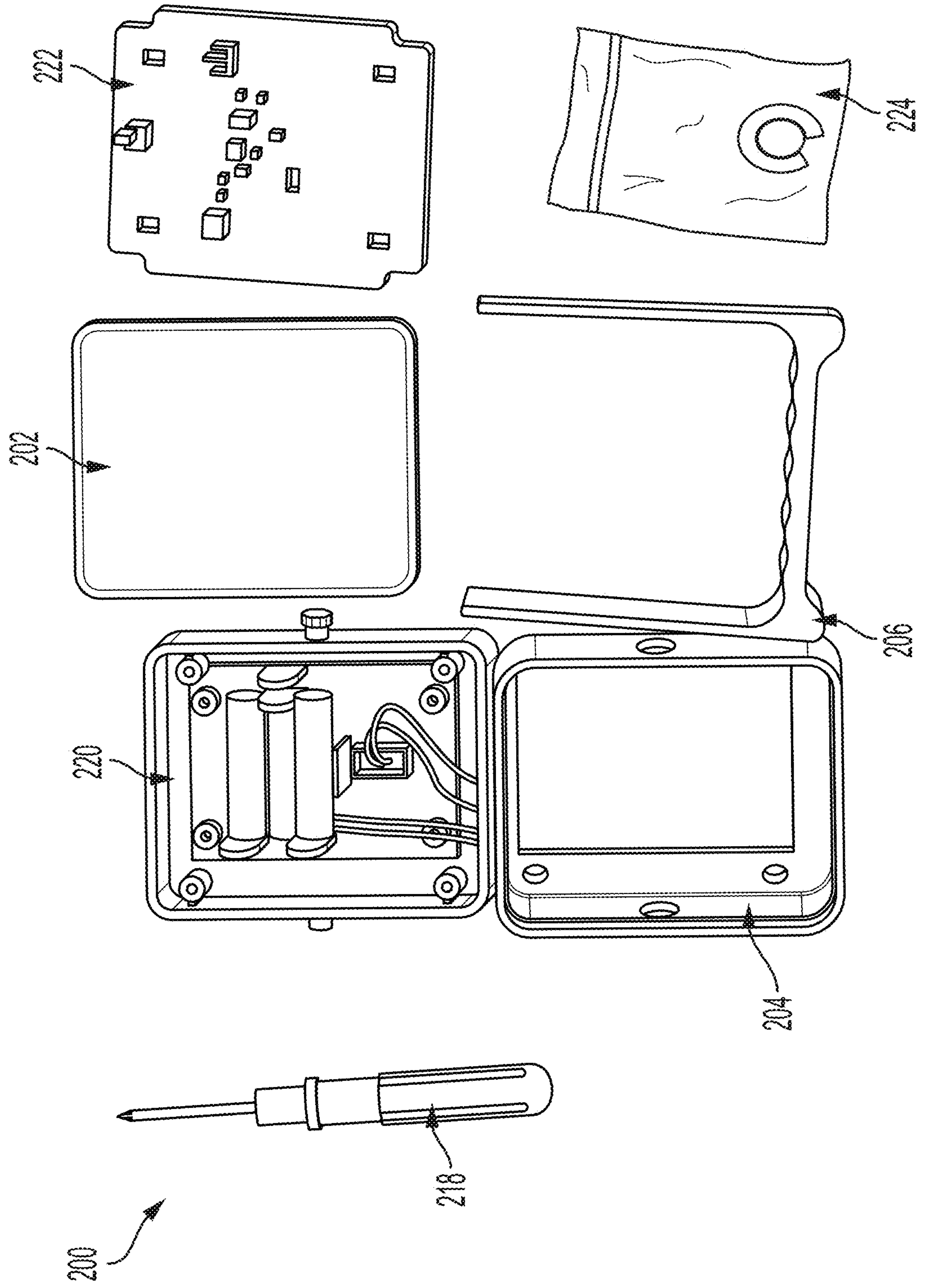

FIGS. 2A-2B illustrate components of a solar light kit, in accordance with some embodiments. The solar light kit may include any of the features of solar light 100 described with respect to FIG. 1A-1D. As shown in FIG. 2A, a solar light kit package may comprise unassembled solar light 200 and a handheld tool 218 for building. The solar light may be constructed with the use of a single tool, which may be a screwdriver or wrench. For example, handheld tool 218 may be a flat head, Phillips or hexagon screwdriver; or hexagon (i.e., Allen), open-ended, or ratchet wrench. Handheld tool 218 may be sized for ease of use for the intended user population (i.e., children). Additional components of the solar light kit may be stored within the interior of unassembled solar light 200. By storing individual components of the kit within solar light 200, the package is self-contained, reduces need for extra waste, and may aid in easing transportation of a large number of kits.

A builder, such as a young student, a child, or another intended user may open solar light 200 to reveal modular components that require assembly in a particular fashion (i.e., in a specific orientation) and following an ordered set of steps. For example, as shown in FIG. 2B, the builder may disengage housing 220 from bumper 204, handle 206, and lens 202 to reveal additional components of the kit. For example, housing 220 and lens 202 may comprise one or more features which are configured to mate and be removably attachable to one another. Additional components stored within the unassembled solar light 200 include printed circuit board (PCB) 222, and a package of removable fasteners 224. PCB 222 and housing 220 may each comprise additional modular features which are already connected and do not require additional assembly (i.e., no solder, wiring, etc.) by the builder, as will be described in greater detail with respect to FIGS. 3A-3G.

Figure 3A:
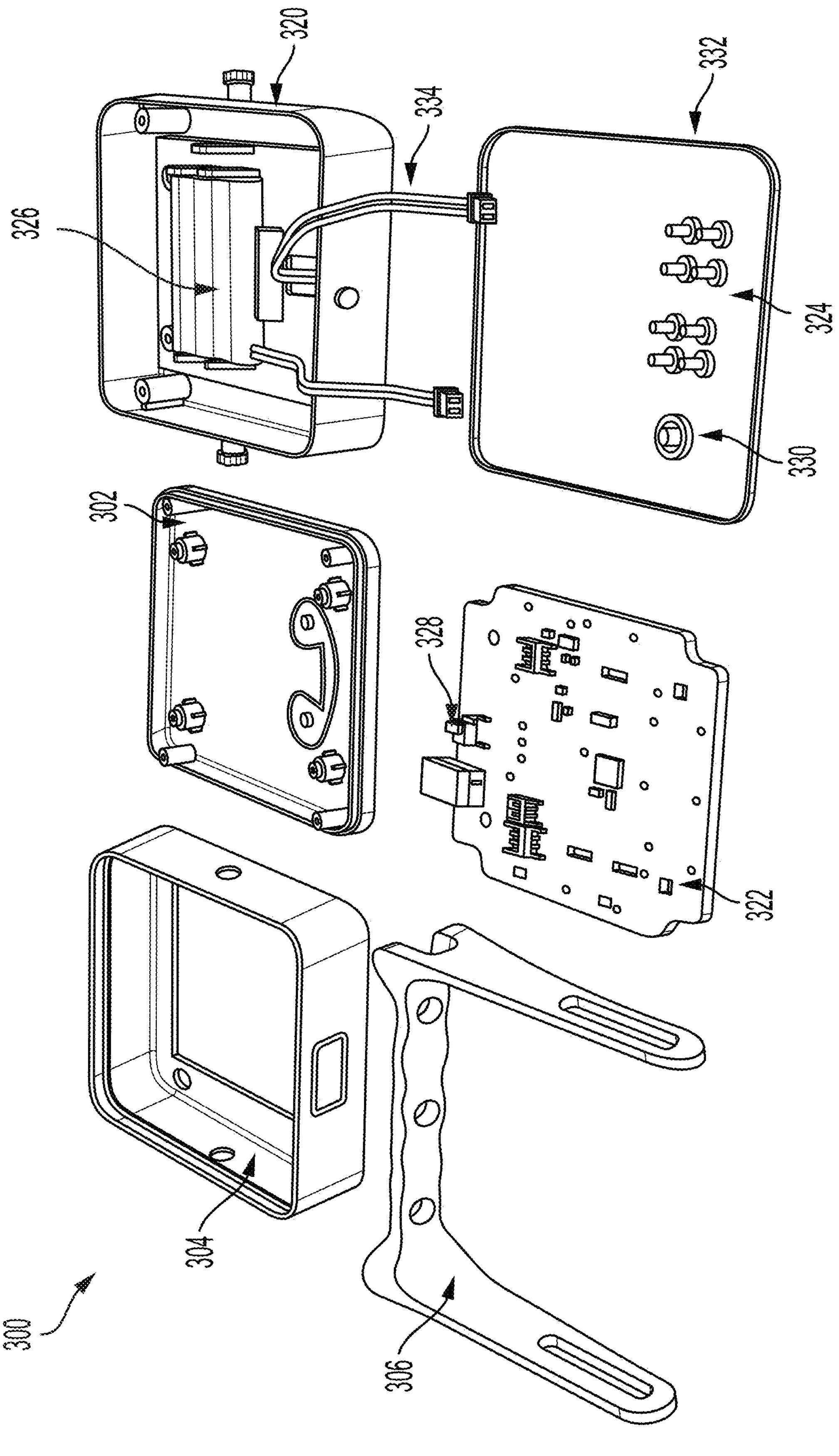
FIGS. 3A-3G illustrate an assembly of components of a solar light kit, in accordance with some embodiments.

FIGS. 3A-3G illustrate assembly of a solar light from components of a solar light kit, in accordance with some embodiments. The unassembled solar light 300 may include any one or more of the features of solar light 100 and 200 described with respect to FIGS. 1A-1D and 2A-2B, respectively. As shown in FIG. 3A, a solar light kit may include bumper 304, lens 302, housing 320, PCB 322, and handle 306. The solar light kit may additionally include seal 332 and switch button 330. PCB 322 may include additional modular features, such as switch 328, and housing 320 may include additional modular features such as rechargeable battery 326 and wires 334. Furthermore, housing 320 may comprise a modular solar panel on a side opposite battery 326 (not illustrated), such that wires 334 are electrically connected to the solar panel through an opening in housing 320. The solar panel and battery 326 may be configured to fit into housing 320 in a particular orientation and may removably lock into place in one or more dedicated features within housing 320.

The assembly of a solar light from solar light kit 300 will now be described with respect to FIGS. 3B-3G. Solar light 300 may be assembled from the package in a classroom setting by students as a form of social STEM learning. By providing a solar light kit as an activity in education systems, students may not only learn about solar technology and how to assemble a solar light, but also about energy poverty in other countries, since students donate the light to children in need once constructed. In some embodiments, solar light 300 may be assembled in settings other than education systems. The solar light kit may be designed such that each individual component within the kit is required to be assembled in a particular order and/or fashion to achieve a functional solar light, as will be described in greater detail below. Furthermore, each component of the device may be assembled into the solar light in a single orientation. Additionally, the solar light kit may be constructed with the use of at most one handheld tool, not requiring the use of techniques such as soldering wire connections. The kit may be accompanied by an instruction manual, which provides step-by-step instructions with diagrams/images to successfully assemble the solar light. The instructions may be intended for children, including figures and simple instructions for the intended user to comprehend. The instructions may be included in the form of a paper manual, or electronically via a QR code, for example.

Figure 3B:
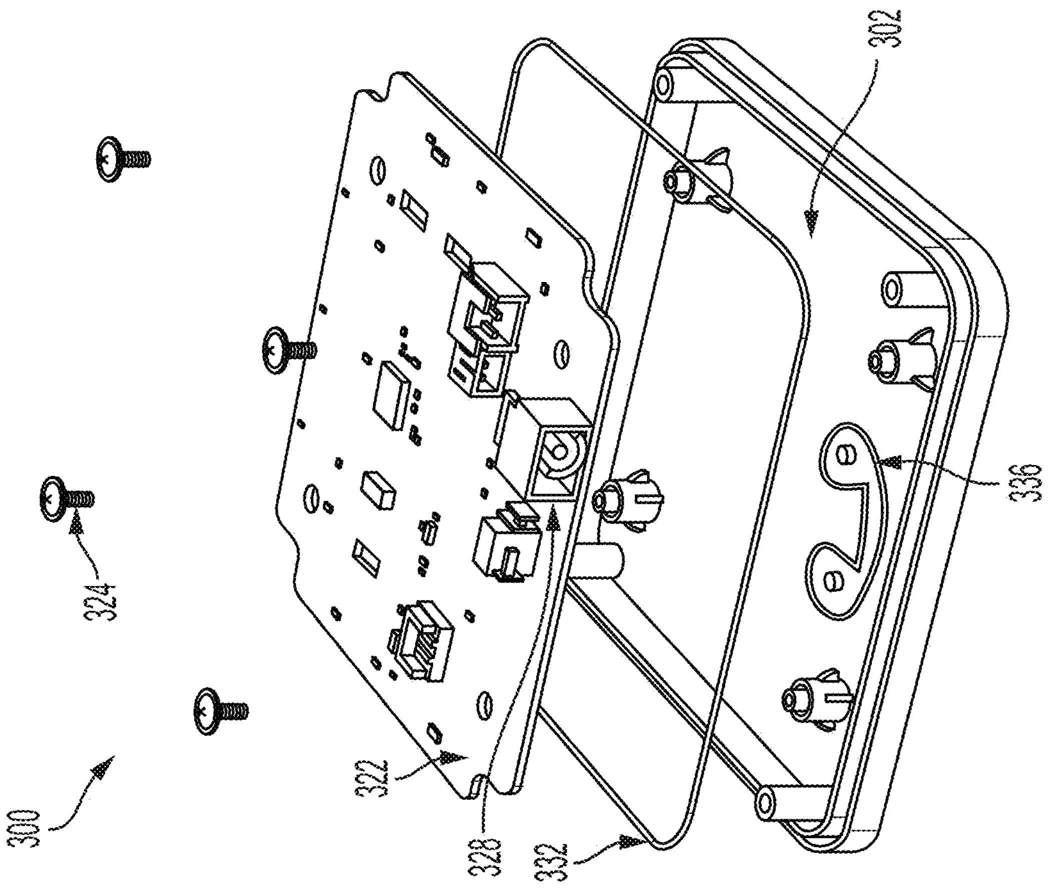

After a user opens solar light 300 as described above with respect to FIGS. 2A-2B, the builder may begin to assemble according to the instructions. As illustrated in FIG. 3B, the user may first insert seal 332 into a slot on lens 302, the slot extending the perimeter of lens 302. Seal 332 may be made of an elastomer, such as those described above, and may be configured to protect the inner components of the solar light from water damage. Thus, it is imperative that the seal is inserted to the slot on lens 302 in assembling the light prior to closing the light (i.e., reattaching lens 302 to housing 320). Either before or after installing seal 332, the builder may install PCB 322 to lens 302, such as through the use of a plurality of removable fasteners 324. Fasteners 324 may include any combination of screws, nuts, bolts, or other removable fasteners. For example, the fasteners may include a set of short screws and a set of long screws intended for different uses in assembling the solar light. In some embodiments, removable fasteners, such as short screws, may be installed to PCB 322 and lens 302 at each of the 4 corners of rectangular PCB 322 and lens 302. Screws 324 may be tightened using screwdriver 218, for example. In some embodiments, one or more of lens 302 and/or PCB 322 may be configured to receive bolts in addition to or in place of screws 324 and configured to be tightened with a wrench. For example, lens 302 and/or PCB 322 may be configured to receive screws with a hexagonal cap configured to be tightened with an Allen wrench.

In some embodiments, lens 302 may be configured to attach to PCB 322 without the use of fasteners 324. For example, lens 302 may comprise one or more connection features (e.g., snap fasteners, adhesive fabric, pins, tabs) configured to removably attach to a corresponding connection feature on PCB 322. PCB 322 must be installed prior to closure of housing 320 with lens 302 to secure the board, thereby steadying the plurality of LEDs and minimizing any chance of damage to the individual features on PCB 322, such as the LEDs. PCB 322 may be packaged with a majority of the electronic components permanently attached (e.g., soldered), such as the LEDs, switch, and various connections between different components, thereby minimizing any confusion, safety concerns, and complexity for the intended builder (e.g., children).

Lens 302 may include a plurality of connection features (e.g., ports) intended to receive fasteners 324 and/or connection features on PCB 322. For example, lens 302 may comprises 2 ports located relative to each corner of the rectangular lens 302. In some embodiments, of the 2 ports in a given corner of lens 302, the ports positioned nearer to the center of lens 302, are configured to receive the short screws. In some embodiments, in the instance PCB 322 comprises tabs, lens 302 may comprise slots configured to receive the tabs during attachment. PCB 322 shall be installed such that the location of switch 328 on PCB 322 is oriented in the direction of the facial features 336 on t lens 302, as shown. In some embodiments, facial features 336 are observed by a user when the light is turned on because lens 302 is textured to diffuse the light in all areas other than at that of facial features 336. In some embodiments, facial features 336 are printed onto the outer surface of lens 302. Switch 328 must be oriented in the same direction as facial features 336 (i.e., at the upper/top portion of lens 302) so that the location correlates with that of a button indicator on the bumper 304, which will be described in greater detail below.

Figure 3C:
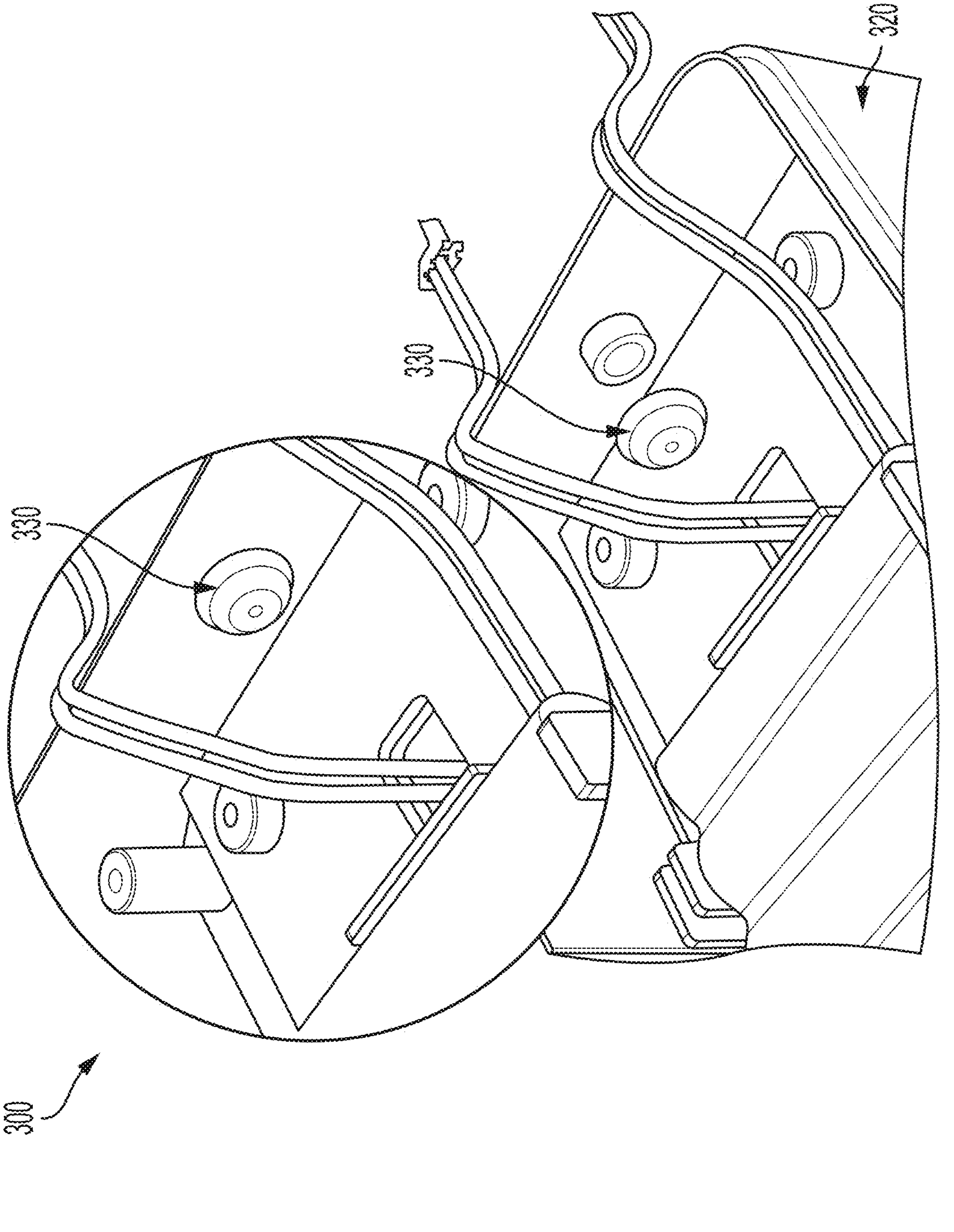

Following installation of PCB 322 to lens 302, with reference to FIG. 3C, the builder may insert a portion of switch button 330 to a corresponding through-hole on housing 320. The hole may be positioned on a top surface of housing 320 and sized such that the fit between the rubberized (i.e., pliable elastomer) switch button 330 and through-hole is a transition fit, for example. Thus, a portion of switch button 330 may be inserted to the through-hole with minimal effort by the user, due at least in part to the material of the button and housing, as well as the type of fit, thereby maintaining its position in the hole after insertion. At least a portion of switch button 330 may have a diameter larger than that of the through-hole on housing 320 (i.e., a cap), such that the cap provides a mechanism which prevents the builder from pushing the full switch button 330 into the through-hole. The switch button 330 must be inserted from the inside of housing 320, such that the cap portion of switch button 330 is on the inside of housing 320 and may engage with switch 328, as will be described below. Once correctly inserted, the switch button may have an end on the outside of housing 320 configured to engage with a button indicator on the bumper during use.

Figure 3D:
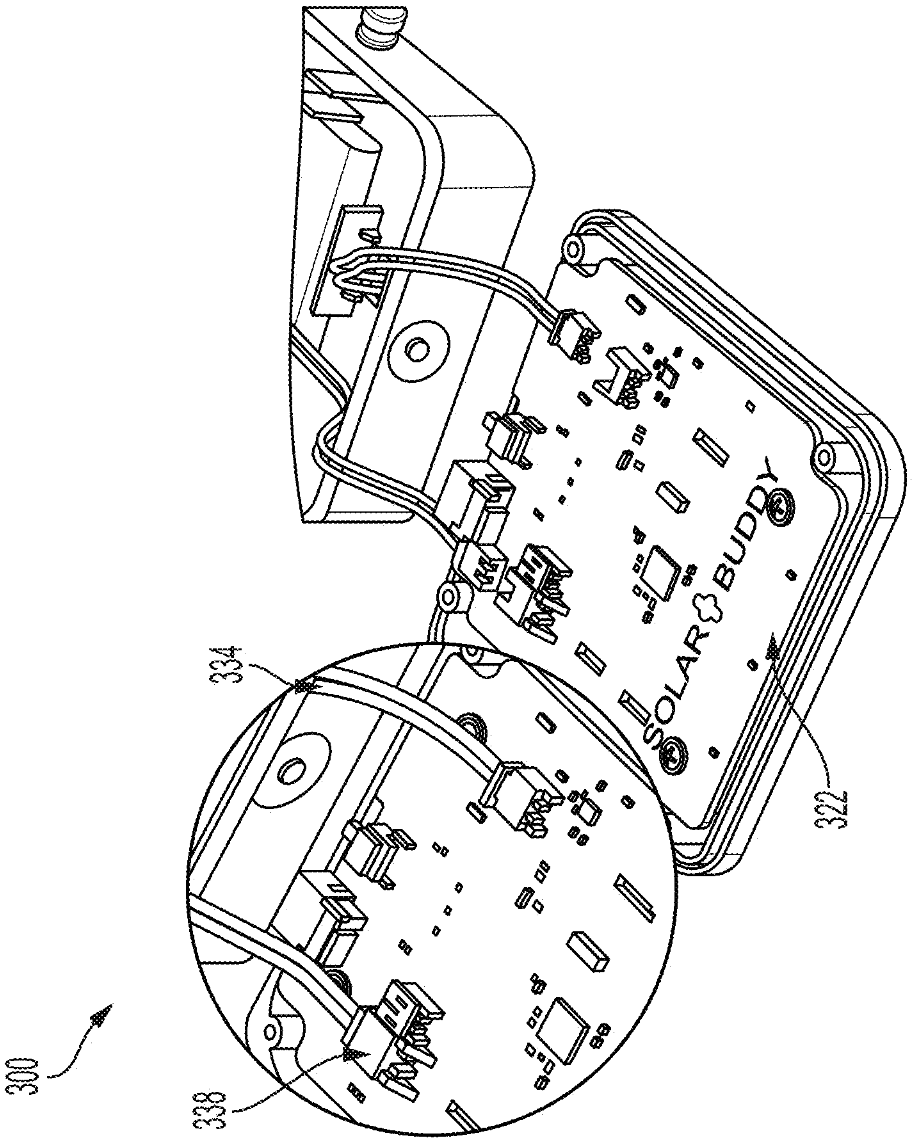

Following installation of switch button 330 to housing 320, as shown in FIG. 3D, the builder may connect plugs on wires 334 to the corresponding sockets on PCB 322. Sockets 338 may be pre-installed on PCB 322 to minimize injury that may accompany soldering the connections. PCB 322 may be labeled to indicate which socket 338 is configured to receive the plugs on wires 334 from the solar panel and from the battery, thereby minimizing risk of confusion in assembling the light. Wires 334 may be removably connected to sockets 338 via one or more wire-board connectors. For example, when the user applies pressure to connect the plug on wire 334, the plug clicks into place, or remains in place until desired removal due to the friction between the socket and plug. Wires 334 may be designed and/or selected specifically to provide safe power from the solar panel 314 to PCB 322.

Prior to connecting wires 334 to PCB 322, the builder must ensure seal 332 is installed to the slot of lens 302, because the wires once connected may obstruct a portion of the lip of lens 302, thereby making it impossible to successfully install the seal without again disconnecting the wires. Seal 332 provides water protection to the inner components of device 300, and thus it is important the seal is installed at the correct time. It is imperative that wires 334 are correctly connected to their respective sockets 338 to achieve a functioning end product.

Figure 3E:
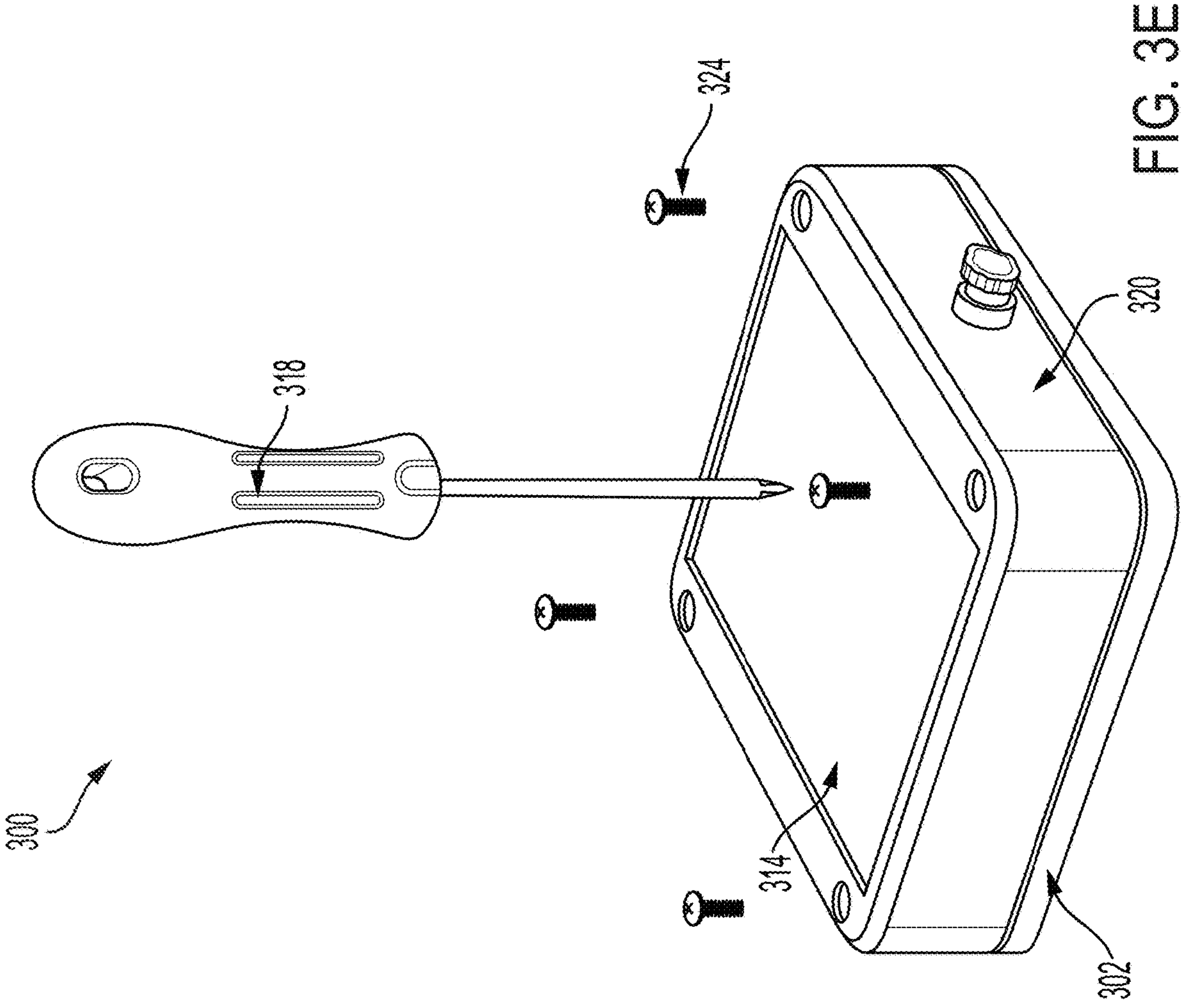
Figure 3F:
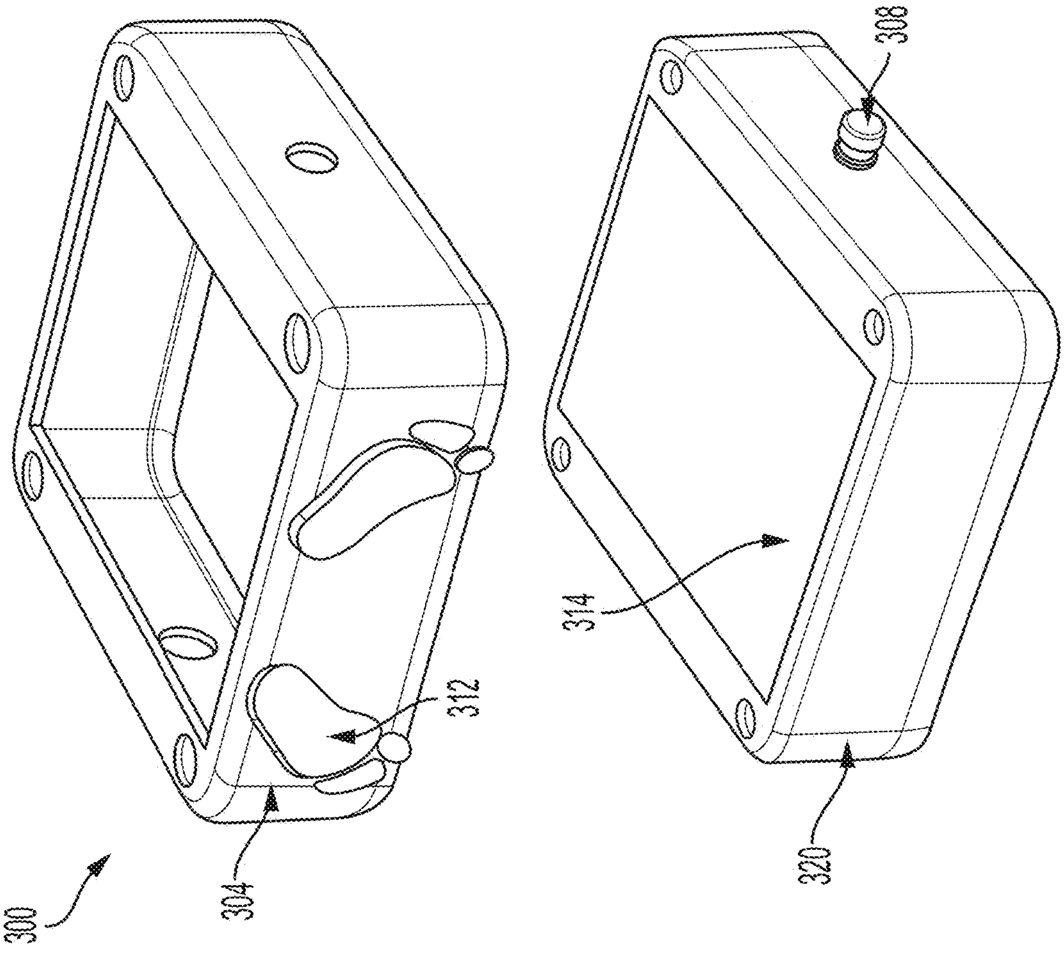
Figure 3G:
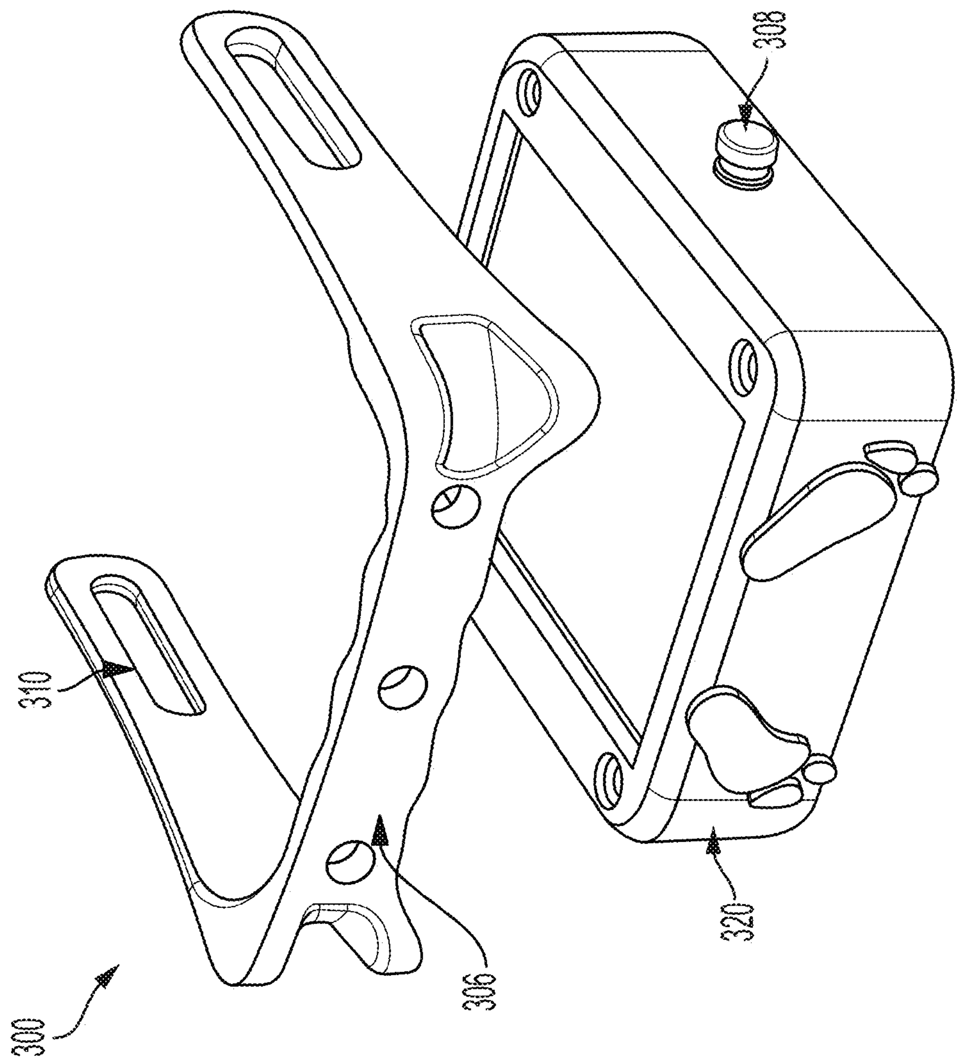

Following successful installation of the internal components described above with respect to FIGS. 3B-3D, the user may close solar light 300 by aligning PCB 322 and battery 326 inside housing 320, such that the side of lens 302 with one or more facial features 336 is facing outwards. The builder may ensure proper orientation of lens 302 on housing 320 by aligning the location of switch button 330 on housing 320 with switch 328 on PCB 322 (which is attached to lens 302). As shown in FIG. 3E, once the components are aligned properly, the user may secure solar light 300 with removable fasteners 324, or via one or more tabs/slots configured to mate between housing 320 and lens 302. In embodiments with fasteners 324, a set of large screws, compared to the screws that may be used to install PCB 322 to lens 302, may be employed. In some embodiments, rather than screws, removable fasteners 324 may comprise a combination of nuts/bolts. In some embodiments, lens 302 and/or housing 320 may be configured to receive screws with a hexagonal cap which are configured to be tightened with an Allen wrench.

Lens 302 may comprise a port in each corner of the lens (described above and illustrated in FIG. 3B), configured to receive large screws. The builder may install removable fasteners 324 using a handheld tool, such as screwdriver 318. In embodiments where the fasteners 324 are nuts/bolts, the user may install the fasteners with a wrench, described in greater detail above. By installing fasteners 324 to the light, solar light 300 is secure, and the risk of damage to the internal components is minimized. In some embodiments, at any time during use, the intended user may uninstall one or more fasteners 324 from housing 320 to access one or more internal components, such as to ensure adequate functionality or replace one or more internal components. Likewise, in the instance lens 302 and housing 320 are removably connected via a set of tabs, for example, on lens 302, which are configured to mate with slots on housing 320, the user may easily apply pressure to disengage and reengage the two components from one another. In some embodiments, housing 320 may comprise tabs, and lens 302 may comprise slots configured to mate with the tabs.

Once housing 320 is secured to lens 302, the builder may install bumper 304 to the edge of removably attached housing 320 and lens 302. Bumper 304 may further secure the connection between lens 302 and housing 320, such as in the instance the two components are connected via tabs/slots rather than removable fasteners. As mentioned above, bumper 304 may comprise a button indicator (illustrated in FIG. 1D) configured to correspond with switch button 330. The builder may use the button indicator on bumper 304 as a hint of the correct vertical orientation of bumper 304 on housing 320. Bumper 304 may comprise one or more lateral holes configured to receive pegs 308 on housing 320. A user may identify the front surface from the back surface of bumper 304 because of a cut-out on the back surface sized such that solar panel 314 is fully exposed to the outside environment. On the other hand, the front surface of bumper 304 may be open to fully expose lens 302. As described above, bumper 304 may comprise one or more features 312 designed to look like feet on the bottom surface to humanize the light. Solar light 300 may additionally be stood upright from the foot features on bumper 304. Bumper 304 may be designed to withstand exposure to water and sunlight, providing extra protection to the remainder of solar light 300. In instances where the user requires access to one or more internal components of the solar light, such as to replace one or more components of the device, bumper 304 may be easily removed from the remainder of the light (i.e., connected housing 320 and lens 302) due to its pliability.

The final step of assembling a solar light from solar light kit 300 may be the installation of handle 306 to the remainder of the light. As described above, handle 306 may comprise one or more slots 310 configured to receive the one or more pegs 308 on housing 320. Slots 310 may comprise multiple settings for adjusting the height of the light during use and allowing for rotation of the light about handle 306. Handle 306 may be removably attachable to the solar light such that the solar light can be used with or without handle 306. Handle 306 may serve more than one purpose, such as to hang the device from the ceiling, to focus light during studying, as a lamp to light up a room, or to hold for walking safely at night.

Once assembled, the solar light may be donated to a child/family living in energy poverty to aid in improving their quality of life. In some embodiments, the constructed light is accompanied by a handwritten letter from the builder (i.e., a child/student in a developed country). Once with the intended end user (i.e., a child), the device may at any time be unassembled to replace one or more components of the device in the instance the light malfunctions. For example, the user may uninstall one or more of the bumper 304, removable fasteners 324, and handle 306 to disengage lens 302 from housing 320 and expose the modular internal components.

Figure 4:
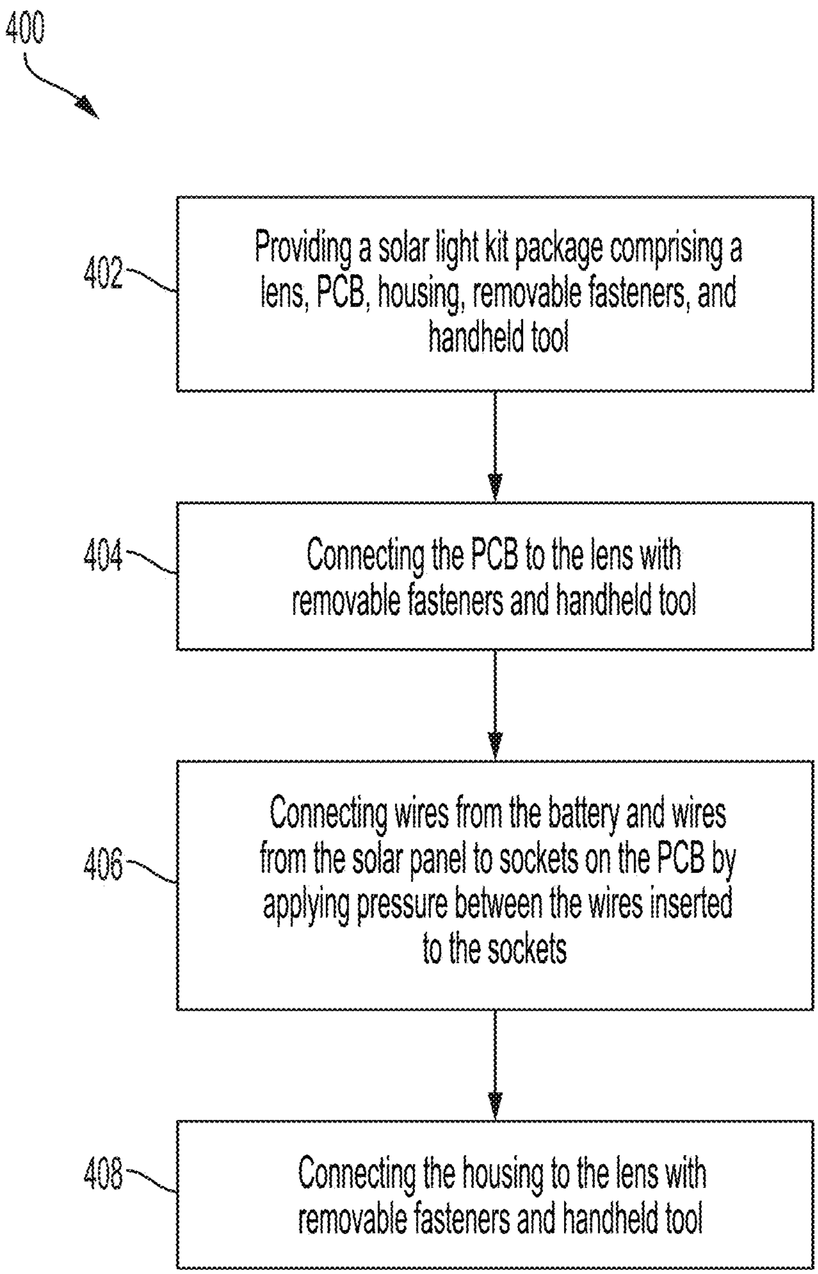
FIG. 4 illustrates a method for assembling a solar light from a kit, in accordance with some embodiments.

FIG. 4 illustrates a method 400 for assembling a solar light from a kit, in accordance with some embodiments. At step 402, a solar light kit may be provided in a kit package, wherein the solar light kit comprises a lens, a PCB, a housing, a plurality of removable fasteners, and a handheld tool. In some embodiments, the housing comprises a removably attached solar panel and a removably attached battery. In some embodiments, each of the components of the solar light kit package may be stored within the removably attached housing and lens, such that the packaging is compact and easily transportable.

At step 404, the user may connect the PCB to the lens. In some embodiments, the PCB may be connected to the lens using one or more of the removable fasteners and the handheld tool. In some embodiments, the PCB may be configured to attach to the lens in a unique orientation, such that a switch on the PCB is oriented in the same direction as an illustrative facial feature on the lens. In some embodiments, the handheld tool may be a screwdriver or a wrench, and the removable fasteners may be one or more of screws, bolts, and nuts configured to be installed using the screwdriver or wrench. In some embodiments, the handheld tool may be intentionally sized for the intended user (i.e., a child).

At step 406, the user may connect one or more wires extending from the battery in the housing to a first socket on the PCB, and may connect one or more wires extending from the solar panel in the housing to a second socket on the PCB. In some embodiments, the PCB may be labeled such that the first socket corresponds to the battery, and the second socket corresponds to the solar panel. In some embodiments, the wires from the battery and solar panel may be inserted to the first and second sockets on the PCB by the user applying pressure between the wires and sockets. In some embodiments, the connections between the PCB and battery and solar panel may be disengaged, for example, if one or more components of the device requires replacement.

At step 408, the user may connect the housing to the lens, for example using one or more fasteners and the handheld tool. In some embodiments, the user may align a switch button inserted to the housing with the switch on the PCB (attached to the lens) to achieve the correct orientation in connecting the housing to the lens. In some embodiments, the lens and housing may be configured to attach with one or more tabs and slots. For example, the lens may comprise one or more tabs configured to fit into one or more slots in the housing. In some embodiments, the housing and lens can be detached to replace one or more internal components of the solar light. In some embodiments, each of the PCB, solar panel, battery, and PCB may be configured to fit in a specific orientation within the housing.

In some embodiments, the solar light kit may include a handle and bumper. The handle may removably attach to at least to pegs on the lateral surfaces of the solar light via two or more slots on the handle. In some embodiments, the solar light may be configured to hang or stand from the handle. The bumper may be configured to mold around at least a portion of the connected lens and housing. The bumper may comprise one or more features, such as a button indicator configured to correspond with the position of the switch button in the housing, and one or more illustrative foot features. In some embodiments, the facial features on the lens and foot features on the bumper may aid in humanizing the solar light for both the builder and the intended end user (i.e., children), wherein the users may be unfamiliar with solar light technology.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method of assembling a solar light kit, comprising:

providing the solar light kit in a kit package comprising a lens, a printed circuit board (PCB), a housing, a plurality of removable fasteners, and a handheld tool, wherein the housing comprises a removably attached solar panel and a removably attached battery;

connecting the PCB to the lens using one or more of the plurality of removable fasteners and the handheld tool by orienting a switch on the PCB with one or more illustrated facial features on the lens;

electrically connecting wires from the battery in the housing to a first socket on the PCB and wires from the solar panel in the housing to a second socket on the PCB, wherein the connections are secured by applying pressure between the wires from the battery inserted to the first socket, and between the wires from the solar panel inserted to the second socket; and connecting the housing to the lens using one or more of the plurality of removable fasteners and the handheld tool, wherein each of the solar panel, battery, and PCB fit in one orientation within the housing.

2. The method of claim 1, wherein prior to connecting the wires from the battery and solar panel to the first and second sockets on the PCB, the method includes inserting a seal into a lip of the lens, wherein the lip extends a perimeter of the lens.

3. The method of claim 1, wherein prior to connecting the housing to the lens, the method includes inserting a switch button to a hole in the housing configured to receive at least a portion of the switch button.

4. The method of claim 3, wherein connecting the housing to the lens includes orienting the switch button inserted to the housing with the switch on the PCB connected to the lens.

5. The method of claim 1, wherein subsequent to connecting the housing to the lens, the method includes placing a bumper around at least a portion of the connected lens and housing, wherein the orientation of the bumper around the portion of the connected lens and housing is based at least in part on a position of a button indicator on the bumper, the button indicator configured to align with a position of a switch button inserted to the housing.

6. The method of claim 1, including attaching a removable handle to the housing by connecting at least two pegs on the housing to at least two slots on the handle.

7. The method of claim 6, wherein an angle of an assembled solar light is configured to be adjustable by rotating the handle about the at least two pegs on the housing.

8. The method of claim 6, wherein a height of an assembled solar light is configured to be adjustable by modifying a position of the at least two pegs within the at least two slots of the handle.

9. The method of claim 8, wherein the at least two slots provide at least two height settings for the assembled solar light.

10. The method of claim 1, wherein the first socket is labeled “battery” and the second socket is labeled “solar panel,”.

11. The method of claim 1, wherein the handheld tool is a screwdriver sized for use by a child and the removable fasteners are screws configured for use with the screwdriver.

12. The method of claim 1, wherein the handheld tool is a wrench sized for use by a child and the removable fasteners include one or more of bolts, nuts, and screws configured for use with the wrench.

13. The method of claim 1, wherein each of the connections between the PCB and the lens, the housing and the lens, the wires from the battery and the first socket, and the wires from the solar panel and the second socket do not require using solder, glue, or adhesive.

14. The method of claim 1, wherein the wires from the battery are removably inserted into the first socket and the wires from the solar panel are removably inserted into the second socket.

15. The method of claim 1, wherein an assembled solar light is repairable by removing the one or more removable fasteners from the connected housing and lens to disconnect the lens from the housing and replacing one or more of the battery, the solar panel, and the PCB.

16. A solar light kit, comprising:

a housing comprising a removably attached solar panel and a removably attached battery;

a PCB comprising one or more light sources and a switch, the PCB configured to connect to the solar panel and the battery;

a lens for diffusing light from the one or more light sources of the PCB, wherein the lens is configured to connect to the housing and the PCB such that one or more illustrated facial features on the lens is oriented with the switch on the PCB;

a plurality of removable fasteners for connecting the lens to one or more of the PCB and the housing; and a tool for fastening the plurality of removable fasteners, wherein the housing, the PCB, the lens, the plurality of removable fasteners, and the tool are bundled together unassembled in a kit package.

17. The solar light kit of claim 16, comprising a seal configured to be installed to a perimeter of the lens.

18. The solar light kit of claim 16, wherein the housing is configured to receive a switch button, the switch button configured to connect with the switch on the PCB.

19. The solar light kit of claim 16, wherein the PCB comprises at least two sockets, a first socket configured to connect to wires from the battery, and a second socket configured to connect to wires from the solar panel.

20. The solar light kit of claim 16, comprising a bumper configured to surround at least a portion of the connected housing and lens.

21. The solar light kit of claim 20, wherein the bumper comprises a button indicator, a position of the button indicator configured to align with a position of a switch button inserted into the housing.

22. The solar light kit of claim 16, comprising a handle configured to removably attach to at least two pegs on the housing, the handle comprising at least two slots configured to receive the at least two pegs.

23. The solar light kit of claim 22, wherein an assembled solar light is configured to be hung from or stood with the handle.

24. The solar light kit of claim 22, wherein at least one of a height of an assembled solar light and an angle of the assembled solar light about the handle is adjustable.

25. The solar light kit of claim 24, wherein the at least two slots provide at least two height settings for the assembled solar light.

26. The solar light kit of claim 16, wherein the tool is the only tool needed for assembly of the solar light kit.

27. The solar light kit of claim 16, wherein the handheld tool is a screwdriver sized for use by a child and the removable fasteners are screws configured for use with the screwdriver.

28. The solar light kit of claim 16, wherein the handheld tool is a wrench sized for use by a child and the removable fasteners include one or more of bolts, nuts, and screws configured for use with the wrench.

29. The solar light kit of claim 16, wherein the PCB comprises at least 18 light sources, and wherein the light sources are light-emitting diodes (LEDs).

30. The solar light kit of claim 29, wherein a first portion of the light sources are white LEDs, and a second portion of the light sources are colored LEDs.

31. The solar light kit of claim 30, wherein at least one light source of the second portion of light sources is a battery indicator for indicating a charge status of the battery.

32. The solar light kit of claim 16, wherein the battery is a rechargeable lithium-ion battery.

33. The solar light kit of claim 16, wherein the solar panel is a polycrystalline silicon solar panel comprising at least 10 photovoltaic (PV) cells.

34. The solar light kit of claim 16, comprising a set of instructions for guiding a user through assembling the solar light from the solar light kit.

* * * * *